United States Patent
Xu et al.

(10) Patent No.: US 10,313,185 B2
(45) Date of Patent: Jun. 4, 2019

(54) METHOD AND DEVICE FOR UPDATING MULTIMEDIA BROADCAST MULTICAST CONTROL CHANNEL INFORMATION

(71) Applicant: ZTE CORPORATION, Shenzhen, Guangdong Province (CN)

(72) Inventors: Hui Xu, Shenzhen (CN); Zijiang Ma, Shenzhen (CN); Yaying Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 233 days.

(21) Appl. No.: 15/308,368

(22) PCT Filed: Jul. 15, 2014

(86) PCT No.: PCT/CN2014/082207
§ 371 (c)(1),
(2) Date: Nov. 2, 2016

(87) PCT Pub. No.: WO2015/168985
PCT Pub. Date: Nov. 12, 2015

(65) Prior Publication Data
US 2017/0070388 A1 Mar. 9, 2017

(30) Foreign Application Priority Data
May 7, 2014 (CN) .......................... 2014 1 0190615

(51) Int. Cl.
*H04L 12/24* (2006.01)
*H04L 1/00* (2006.01)
(Continued)

(52) U.S. Cl.
CPC ........ *H04L 41/0816* (2013.01); *H04L 12/189* (2013.01); *H04W 4/06* (2013.01); *H04W 72/005* (2013.01); *H04W 72/10* (2013.01)

(58) Field of Classification Search
CPC .. H04L 41/0816; H04L 12/189; H04W 72/10; H04W 72/005; H04W 4/06
See application file for complete search history.

(56) References Cited

U.S. PATENT DOCUMENTS

2015/0098385 A1* 4/2015 Navalekar ................. H04L 1/00
370/312

FOREIGN PATENT DOCUMENTS

| CN | 101998258 A | 3/2011 |
|---|---|---|
| CN | 101998272 A | 3/2011 |

(Continued)

OTHER PUBLICATIONS

R2-133142; GCSE architecture introduction and its influence on RAN solution. ZTE; 3GPP TSG-RAN WG2 Meeting #83bis Oct. 7-11, 2013, Ljubljana, Slovenia.
(Continued)

*Primary Examiner* — Kiet Tang
(74) *Attorney, Agent, or Firm* — Ling Wu; Stephen Yang; Ling and Yang Intellectual Property

(57) ABSTRACT

Disclosed are a method for updating multimedia broadcast multicast control channel information, a method for receiving updated multimedia broadcast multicast control channel information, a network device and a user equipment. Herein, the method includes: updating, by a network side, MCCH information in a short Multicast Control CHannel MCCH modification period, and when the MCCH information to be updated is related to a resource configuration change of Multimedia Broadcast Multicast Service MBMS traffic data, selecting, by the network side, to update the MCCH information in the short MCCH modification period or selecting to update the MCCH information in a normal MCCH modification period, based on the priority of the MBMS traffic data for which resource configuration is changed; transmitting, by the network side, the updated MCCH information.

16 Claims, 6 Drawing Sheets

(51) Int. Cl.
H04W 4/06 (2009.01)
H04L 12/18 (2006.01)
H04W 72/00 (2009.01)
H04W 72/10 (2009.01)

(56) References Cited

FOREIGN PATENT DOCUMENTS

CN 102111716 A 6/2011
CN 103581832 A 2/2014

OTHER PUBLICATIONS

R2-141090; Specify new value for MCH/MCCH period for group communication. ZTE; 3GPP TSG-RAN WG2 #85bis, Valencia, Spain, Mar. 31-Apr. 4, 2014.
R2-141688; Discussion on forward compatibility issues on group communication enhancements; Alcatel-Lucent; 3GPP TSG-RAN WG2 #85bis, Valencia, Spain, Mar. 31-Apr. 4, 2014.
3rd Generation Partenship Project; Technical Specification Group Radio Access Network; Evolved Universal Terrestrial Radio Access (E-UTRA) ; Study on group communication for E-UTRA. Mar. 2014.

* cited by examiner

METHOD AND DEVICE FOR UPDATING MULTIMEDIA BROADCAST MULTICAST CONTROL CHANNEL INFORMATION

TECHNICAL FIELD

The present document relates to data updating technologies in the field of communications, and more particularly, to a method for updating Multimedia Broadcast Multicast Control Channel MCCH information, a network device, a method for receiving updated MCCH information, and a user equipment.

BACKGROUND OF THE RELATED ART

In the process of realizing the technical solution of the embodiment of the present application, there are at least the following technical problems in the related art:

with the rapid development of the Internet and the popularity of large-screen multi-function mobile phones, a large number of mobile data multimedia services and various high-bandwidth multimedia services, such as video conferencing, TV broadcasting, video on demand, advertising, online education and interactive games, have been emerged. These services, in one aspect, meet the growing service demands of mobile users, and also bring new business growth points for mobile operators in another aspect. These mobile data multimedia services require that multiple users can simultaneously receive the same data, which, compared with general data services, have features of a large amount of data, long duration, time-sensitive and so on.

In order to utilize the mobile network resources effectively, the 3rd Generation Partnership Project 3GPP proposes Multimedia Broadcast/Multicast Service MBMS. The MBMS is a technology transferring data from one data source to multiple targets, thus realizing the sharing of network resources (including core network and access network) and improving the utilization rate of network resources (especially air interface resources). MBMS defined by 3GPP not only can implement message-based multicast and broadcast with plain text and low-rate, but also can implement broadcast and multicast of high-speed multimedia services. The MBMS offers a wide variety of enriched videos, audios and multimedia services, which conforms to the trend of future mobile data development and provides a better business prospects for the 3G development.

In the Long Term Evolution LTE, the MBMS service may use the multicast mode, which is called Multicast/Broadcast over Single Frequency Network MBSFN transmission mode, and the MBMS service that uses the multicast mode is also called MBSFN service, which may use the same modulated coding format and the same physical resources to generate the same content in a plurality of cells. MBMS multi-cell transmission has the following features: 1) synchronous transmission in the MBSFN area; 2) support to combine multi-cell MBMS transmission; 3) Multicast Traffic Channel MTCH and Multicast Control CHannel MCCH are mapped to the MCH transmission channel under the point to multi-point p-T-m mode; 4) MBSFN-synchronized area, MBSNF area, MBSFN transmission, Advertisements and reserved cells are all semi-statically configured by the operation and maintenance. Therefore, user equipments UEs of the plurality of cells may receive a plurality of MBMS data having the same content and perform a single frequency network SFN combination, in order to increase the gain of the received signal. The multiple cells that use the same physical resources and use the MBSFN transmission mode to transmit the same MBMS service constitute one MBSFN area.

In an actual LTE networking, there are a plurality of MBSFN services in one MBSFN area. All MBSFN services belonging to the same MBSFN area are called an MBSFN service group. That is, one MBSFN service group only belongs to one MBSFN area. An MBSFN area includes a plurality of cells, each of which is configured with exactly the same MBSFN service group. The MTCHs with multiple MBSFN services of the same MBSFN area and the control channel MCCH of MBSFN services may be multiplexed into one Multicast CHannel MCH. The MCCH and a plurality of MTCHs, i.e., a plurality of logical channels, of the same MBSFN area may be mapped onto the same transmission channel MCH; the MCH is carried by the transport block of the MBSFN subframe.

In the existing art, the MSAP occasion is also introduced in an MBSFN Subframe Allocation Pattern MSAP concept. The MSAP occasion indicates all multicast resources included in one MCH corresponding to a certain MSAP in a time period of a dynamic scheduling period. A plurality of MTCHs and dynamic scheduling information may be transmitted in one MSAP occasion, and the MCCH is also included. The dynamic scheduling information is carried in a Media Access Control Protocol Data Unit Control Element MAC PDU CE, and the length of an MSAP occasion may be 320 ms. The time length of one MSAP occasion is a scheduling period, also known as a dynamic scheduling period. One MCH is allocated with one or more MBSFN subframes in one or more MBSFN frames through the MSAP, herein a subframe transmitted in the multicast mode is called an MBSFN subframe and a frame containing the MBSFN subframe is referred to as an MBSFN frame.

Each MSAP occasion configured on one MCH carries the dynamic scheduling information that carries mapping information of the MTCH to the secondary MSAP subframe. This mapping information is determined by means of the MBSFN subframe index-number relationship in one scheduling period. UE may know that each MTCH is allocated to which MBSFN subframes by reading the scheduling information, and the UE may read the MTCH which the UE is interested in on the corresponding MBSFN subframes and ignore the MBSFN subframes which the UE does not need to read, thereby improving the MBMS traffic reception efficiency of the UE and saving the power consumption of the UE. Here, the MBSFN subframe number is determined as: all the MBSFN subframes allocated by an MCH in a scheduling period are sequentially ordered and numbered.

In the existing LTE techniques, multiple logical channels multiplex the MCH channel through the following way: one subframe corresponds to one Transmission Time Interval TTI, one Transport Block TB may be transmitted in one TTI, and each TB corresponds to one Medium Access Control Protocol Data Unit MAC PDU. One MAC PDU may include a plurality of Service Data Units MAC SDUs. These MAC SDUs may be from different logical channels, and possible logical channels include MTCHs, MCCHs, and the like. The data from these different logical channels are concatenated together in the MAC PDU and then transmitted on the physical channel.

The MBMS Scheduling Information MSI MAC control unit, as shown in FIG. 1, is identified by an MAC PDU header carrying a Logical Channel Identifier LCD. The MAC control unit has a variable length of 2xbytes (x is the number of elements in the MBMS-SessionInfoList sequence). Each MTCH shall include the following fields:

LCID: this field indicates the logical channel ID of the MTCH, and the length of this field is 5 bits.

Stop MTCH: this field indicates the serial number of the corresponding MTCH end subframe in the MSAP occasion, and the length of this field is 11 bits. The specified Stop MTCH value 2047 indicates that the corresponding MTCH is not scheduled, and the values of the range 2043 to 2046 are reserved.

When a certain MTCH in the MAC PDU is not transmitted, 2047 is used to identify the Stop MTCH. The MCCH information includes the MCH in the MBSFN area, that is, resource configuration of the Physical Multicast CHannel PMCH, i.e., the subframe position information of the MCH, and Modulation and Coding Scheme MCS, MBSFN subframe allocation pattern, and so on. The UE obtains the corresponding MSI starting position through the MCH configuration information in the MCCH, in order to obtain the configuration information of the MBMS service which is interested by the UE. The MCCH periodic transmission includes the repetition period and the modification period. One modification period includes a plurality of repetition periods, and the MCCH content keeps unchanged, while the MCCH content may be changed in different modification periods. FIG. 2 shows a diagram of the MCCH modification period.

Cluster communication system is a specific wireless communication system developed to meet the command scheduling requirements of users in the industry and oriented for the specified applications in the industry. A large number of wireless users in the system share a small number of wireless channels. The cluster communication system takes command scheduling as the main application, and is a multi-purpose, high-efficient wireless communication system. Cluster communication system has a wide range of applications market, such as the government sector, public safety, emergency communications, electricity, civil aviation, petrochemical and military. In 3GPP LTE, cluster communication is called Group Communication Service Enabler GCSE.

The industry is currently discussing the possibility of using the MBMS technology to achieve cluster communications. The existing minimum MCCH modification period is 5.12 seconds, and the minimum MSP is 80 ms. In order to meet the delay requirements of the GCSE service, especially to speed up the session start process of the MBMS, it needs to consider shortening the minimum MCCH modification period and the minimum MSP. Considering the forward compatibility issue, the 3GPP R12 preliminarily determines to shorten the minimum MSP, but no agreement has been reached on shortening the minimum MCCH modification period, while the 3GPP R13 determines to shorten the minimum MCCH period.

If the 3GPP R12 does not shorten the MCCH minimum period and the R13 shortens the minimum MCCH period, the UE in the R12 may have the forward compatibility issue, which is mainly reflected in the impact on the MBMS traffic data update, and it needs to be configured on the network side to solve this forward compatibility issue. However, there is no solution to this problem in the related art.

SUMMARY

In view of this, the embodiment of the present document is expected to provide a method for updating MCCH information, a network device, and a user equipment to at least solve the forward compatibility issue that a UE in the R12 might have since R12 does not shorten the MCCH minimum period while R13 does.

The technical scheme of the embodiment of the present document is realized as follows:

an embodiment of the present document provides a method for updating multimedia broadcast multicast control channel information, herein, the method includes:

updating, by a network side, MCCH information in a short Multicast Control CHannel MCCH modification period. When the MCCH information to be updated is related to a resource configuration change of Multimedia Broadcast Multicast Service MBMS traffic data, based on the priority of the MBMS traffic data for which the resource configuration is changed, selecting, by the network side, to update the MCCH information in a short MCCH modification period; or, selecting to update the MCCH information in a normal MCCH modification period;

transmitting, by the network side, the updated MCCH information.

Alternatively, the method further includes:

the short MCCH modification period including an MCCH modification period less than 5.12 seconds;

the normal MCCH modification period being an MCCH modification period equal to 5.12 seconds.

Alternatively, the resource configuration includes one or more of the following:

subframe allocation ending;

data modulation and coding scheme;

the number of allocated subframes;

Multimedia Broadcast Multicast over Single Frequency Network MBSFN subframe allocation pattern.

Alternatively, the method further includes:

in the short MCCH modification period, except MBMS traffic data with a high priority, not allowing to changed content of the MCCH; and only allowing to change the content of the MCCH in the normal MCCH modification period, which includes one or more items of the following content:

the data modulation and coding scheme of each PMCH can only be changed in the normal MCCH modification period;

the MBSFN subframe allocation pattern of an MBSFN area corresponding to the MCCH only being able to be changed in the normal MCCH modification period;

except the last PMCH, an end subframe of each PMCH only being able to be changed in the normal MCCH modification period, and an end subframe of the last PMCH being able to be changed in a current short MCCH modification period;

except the last PMCH, a number of MBSFN subframes occupied by each PMCH only being able to be changed in the normal MCCH modification period.

Alternatively, the MCCH information is updated when there is an MBMS session start within the short MCCH modification period, and the MBMS session is not on the last PMCH;

the method further includes:

determining, by the network side, the priority of the MBMS traffic data through Quality of Service QoS information of the MBMS;

updating, by the network side, the MCCH information in the short MCCH modification period when judging that the MBMS traffic data for which the resource configuration is changed have a high priority;

updating, by the network side, the MCCH information in the normal MCCH modification period when judging that the MBMS traffic data for which the resource configuration is changed do not have the high priority.

Alternatively, the MBMS traffics in one MBSFN area are distributed on one or more PMCHs, and the MCCH information is updated when there is an MBMS session end in the short MCCH modification period; and the method further includes:

updating, by the network device, the MCCH information in the normal MCCH modification period.

Alternatively, the MBMS traffics in one MBSFN area are distributed on one or more PMCHs, and the MCCH information is updated when there is an MBMS session update in the short MCCH modification period; and the method further includes:

determining, by the network side, the priority of the MBMS traffic data through the QoS information of the MBMS;

updating, by the network side, the MCCH information in the short MCCH modification period when judging that the MBMS traffic data for which the resource configuration is changed have a high priority;

updating, by the network side, the MCCH information in the normal MCCH modification period when judging that the MBMS traffic data for which the resource configuration is changed do not have a high priority;

the MBMS session update includes one or more of subframe allocation ending, data modulation and coding scheme, and MBSFN subframe allocation pattern.

An embodiment of the present document provides a network device, herein the network device includes a judging unit, a selection processing unit, and a transmitting unit; herein, the judging unit is configured to, when MCCH information is updated in a short Multicast Control CHannel MCCH modification period, judge whether the updated MCCH information is related to a resource configuration change of MBMS traffic data, and when the updated MCCH information is related to the resource configuration change of the MBMS traffic data, notify the selection processing unit to implement a processing;

the selecting and processing unit is configured to, based on the priority of the MBMS traffic data for which the resource configuration is changed, select to update the MCCH information in a short MCCH modification period; or, select to update the MCCH information in a normal MCCH modification period;

the transmitting unit is configured to transmit the updated MCCH information.

Alternatively, the short MCCH modification period includes: an MCCH modification period less than 5.12 seconds;

the normal MCCH modification period is an MCCH modification period equal to 5.12 seconds.

Alternatively, the resource configuration includes one or more of the following:

subframe allocation ending;
data modulation and coding scheme;
a number of allocated subframes;
Multimedia Broadcast Multicast over Single Frequency Network MBSFN subframe allocation pattern.

Alternatively, the network device further includes:

a configuring unit, configured to set to not allow to change content of the MCCH in the short MCCH modification period, expect the MBMS traffic data with a high priority, and only allow to change the content of the MCCH content in the normal MCCH modification period, which includes one or more items of the following content:

the data modulation and coding scheme of each PMCH only being able to be changed in the normal MCCH modification period;

the MBSFN subframe allocation pattern of the MBSFN area corresponding to the MCCH only being able to be changed in the normal MCCH modification period;

except the last PMCH, an end subframe of each PMCH only being able to be changed in the normal MCCH modification period, and an end subframe of the last PMCH only being able to be changed in a current short MCCH modification period;

except the last PMCH, a number of MBSFN subframes occupied by each PMCH only being able to be changed in the normal MCCH modification period.

Alternatively, the network device updates the MCCH information when there is an MBMS session start in the short MCCH modification period, and in the case that the MBMS session is not on the last PMCH, the network device further includes:

a priority determining unit, configured to determine the priority of the MBMS traffic data through Quality of Service QoS information of the MBMS;

the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have a high priority.

Alternatively, for the network device, in a case that the MBMS traffic in one MBSFN area are distributed on one or more PMCHs and the MCCH information is updated when there is an MBMS session end in the short MCCH modification period, the selecting and processing unit is further configured to update the MCCH information in the normal MCCH modification period.

Alternatively, in a case that the MBMS traffic in one MBSFN area are configured to distribute on one or more PMCHs, and the MCCH information is updated when there is an MBMS session update in the short MCCH modification period, the network device further includes:

a priority determining unit, configured to determine the priority of the MBMS traffic data through Quality of Service QoS information of the MBMS;

the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have the high priority;

the MBMS session update includes one or more of subframe allocation ending, data modulation and coding scheme, and MBSFN subframe allocation pattern.

The judging unit, the selection processing unit, the transmitting unit, the configuring unit, and the priority determining unit can be implemented with Central Processing Unit CPU, Digital Signal Processor DSP, or Field-Programmable Gate Array FPGA when implementing the processing.

The embodiment of the present document provides a method for receiving updated multimedia broadcast multicast control channel information, herein the method includes:

receiving, by a user side, updated MCCH information;

the updated MCCH information is MCCH information selected by a network side to be updated in a short MCCH modification period, or the MCCH information selected to be updated in a normal MCCH modification period based on the priority of MBMS traffic data for which the resource configuration is changed.

The embodiment of the present document provides a user equipment, herein the user equipment includes:

a receiving unit, configured to receive updated MCCH information for a user side;

the updated MCCH information is: MCCH information selected by a network side to be updated in a short MCCH modification period; or, the MCCH information selected to be updated in the normal MCCH modification period based on the priority of MBMS traffic data for which the resource configuration is changed.

The receiving unit can be implemented with Central Processing Unit CPU, Digital Signal Processor DSP, or Field-Programmable Gate Array FPGA when implementing the processing.

The method for updating MCCH information in an embodiment of the present document includes: when the network side updates the MCCH information in the short MCCH modification period, and when the updated MCCH information is related to the resource configuration change of the MBMS traffic data, based on the priority of the MBMS traffic data for which the resource configuration is changed, the network side selecting to update the MBMS information in the short MCCH modification period; or, selecting to update the MCCH information in the normal MCCH modification period; the network side transmitting the updated MCCH information.

With the embodiment of the present document, for the MCCH information is updated in the short MCCH modification period, according to the priority of the MBMS traffic data for which the resource configuration is changed, the MCCH information may be selected to be updated in the short MCCH modification period, or the MCCH information is selected to be updated in the normal MCCH modification period. Therefore, after the updated MCCH information is transmitted from the network side to the UE side, the updated MCCH information can be correctly read by the UE after reception, thereby solving the forward compatibility issue that the UE in the R12 might have because the R12 does not shorten the MCCH minimum period but the R13 does.

SPECIFIC EMBODIMENTS

In the following, the implementation of the technical scheme will be described in further detail in combination of the accompanying drawings.

The embodiment of the present document mainly includes the following content:

for the network side, a method for updating MCCH information includes: when the network side needs to update MCCH information in an MCCH modification period less than 5.12 seconds, and if the MCCH information to be updated is related to a resource change of the MBMS traffic, based on a priority of the MBMS traffic for which the change occurs, the network side selects to update the MCCH information in a short MCCH modification period; or, selects to update the MCCH information in a normal MCCH modification period. Thereafter, the network side transmits the updated MCCH information to the user side.

Alternatively, the short MCCH modification period includes: an MCCH modification period less than 5.12 seconds.

The normal MCCH modification period is an MCCH modification period equal to 5.12 seconds.

Since the 3GPP R12 does not shorten the MCCH minimum period while the R13 does, the UE in the R12 may have forward compatibility issue, which is mainly reflected in the impact on the MBMS traffic data update, resulting in that the UE cannot recognize MBMS traffic data of the short MCCH modification period, such as an MCCH modification period less than 5.12 seconds. The UE normally can only recognize MBMS traffic data of a long MCCH modification period, which is the minimum modification period with 5.12 seconds or a modification period more than 5.12 seconds. Whereas in the embodiment of the present document, through the configuration at the network side, the forward compatibility of UEs that are interested in receiving the MBMS traffic data still can be guaranteed when an MCCH modification period less than 5.12 seconds is used. Therefore, the UE can recognize the MBMS traffic data of the short MCCH modification period, thus improving the user experience, and solving the forward compatibility issue of the UE.

If not specified, the MBMS in the embodiment of the present document refers to an evolved MBMS, that is, eMBMS; AS refers to a GCSE AS, and a conventional UE refers to a UE having a minimum MCCH modification period of 5.12 seconds. In the embodiment of the present document, the normal MCCH modification period is 5.12 seconds or 10.24 seconds, and the conventional UE can only read the normal MCCH modification period. The short MCCH Modification Period MP is shorter than the normal modification period, and the short MCCH modification period is less than 5.12 seconds, for example: 80 ms, 160 ms, 320 ms, 640 ms, 1.28 s, 2.56 s. The normal UE cannot read the short MCCH modification period.

Figure 1:
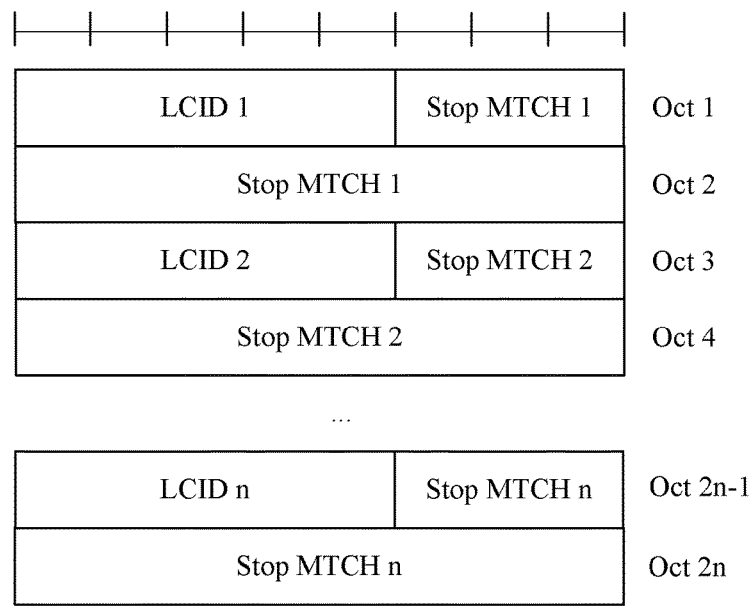
FIG. 1 is a schematic diagram of an MBMS dynamic scheduling information MAC control unit.
Figure 2:
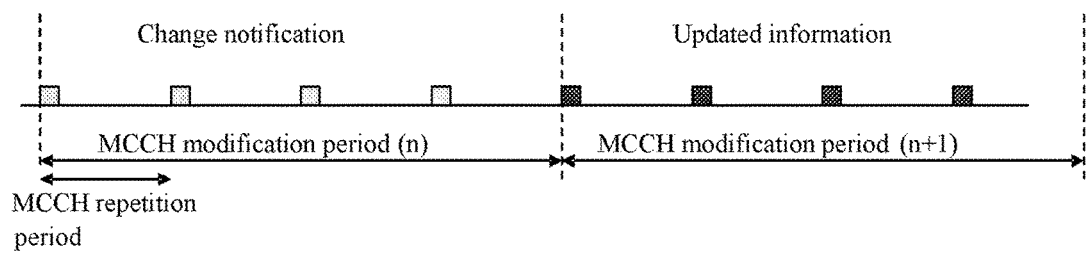
FIG. 2 is a schematic diagram of an MCCH modification period.
Figure 3A:
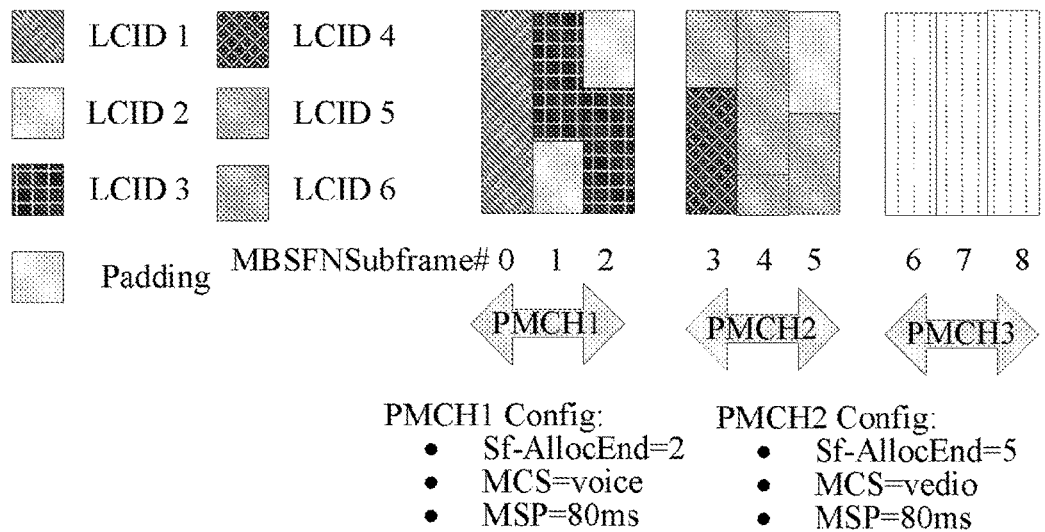
FIG. 3a and FIG. 3b are schematic diagrams of MBMS scheduling information.
Figure 3B:
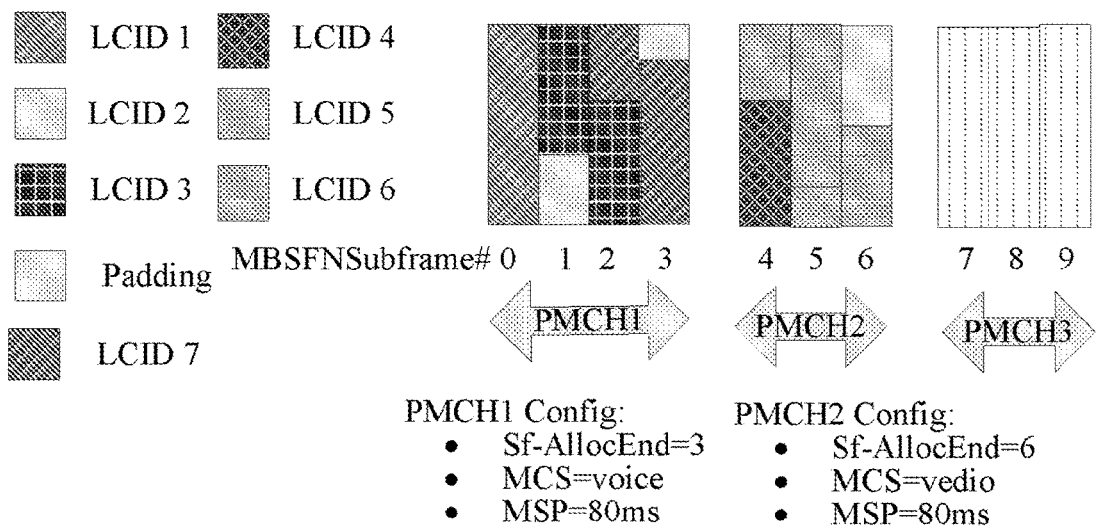

As shown in FIG. 3a and FIG. 3b, it is assumed that there are MBMS traffics on PMCH1 and PMCH2 in one MBSFN area. Herein there are traffics LCID1, LCID2, and LCID3 on the PMCH1, and traffics LCID4, LCID5, LCID6 on the PMCH2. In FIG. 3a, the end position of the PMCH1 is 2: Sf-AllocEnd=2. The subframe configuration information of the PMCH is on the MCCH, when new MBMS traffics appear in the MCCH modification period (e.g., 2.56 s, 1.28 s, 640 ms, . . . ) which is less than 5.12 seconds, LCID7 in FIG. 3b, is allocated to the PMCH1, herein the LCID7 belongs to the voice service, the subframe configuration of the PMCH1 on the MCCH is changed, for example, Sf-AllocEnd=3. For a UE with a minimum MCCH modification period of 5.12 seconds, the updated MCCH information cannot be acquired in a time period less than 5.12 seconds, an error will occur when the UE reads the PMCH2, that is, the new PMCH2 starts from subframe 4, and the conventional UE still reads the PMCH2 from subframe 3.

In summary, in order to guarantee the forward compatibility of the traditional UE (the minimum MCCH modification period is 5.12 seconds), it is necessary to limit the behavior of the network side transmitting the MSI through the following configuration.

Here is some of the relevant content that is configured in the MCCH information:

First, the MBSFN-AreaInfoList information element is structured as follows:

such as changes of OneFrame and FourFrames allocation patterns will change the contents of the PMCH data, thus affecting the traditional UE to receive the MBMS data. In order to guarantee the forward compatibility of the traditional UE, the network side is defined as follows to ensure that the content of the PMCH data is not arbitrarily changed:

When a certain MBSFN area includes a plurality of PMCHs (each PMCH is arranged sequentially, as shown in FIG. 3a and FIG. 3b, PMCHs are numbered in ascending order of the serial number of the MBSFN subframes), and when the MCCH MP is less than 5.12 seconds, that is, the MCCH MP is less than the shortest MCCH MP of Rel9, there are the following configuration requirements:

1) except the last PMCH, the end subframe of each PMCH can only be changed when MCCH MP=5.12 s, and the end subframe of the last PMCH can be changed in the current short MCCH MP;

2) the MCS of each PMCH can only be changed when MCCH MP=5.12 s;

```
-- ASN1START
MBSFN-AreaInfoList-r9  ::=  SEQUENCE  (SIZE  (1..maxMBSFN-Area))  OF
MBSFN-AreaInfo-r9
MBSFN-AreaInfo-r9 :: =      SEQUENCE {
    mbsfn-AreaId-r9              INTEGER (0..255),
    non-MBSFNregionLength        ENUMERATED {s1, s2},
    notificationIndicator-r9     INTEGER (0..7),
    mcch-Config-r9               SEQUENCE {
       mcch-RepetitionPeriod-r9      ENUMERATED {rf32, rf64, rf128, rf256},
       mcch-Offset-r9                INTEGER (0..10),
       mcch-ModificationPeriod-r9    ENUMERATED {rf512, rf1024},
       sf-AllocInfo-r9               BIT STRING (SIZE (6)),
       signallingMCS-r9              ENUMERATED {n2, n7, n13, n19}
    },
    ...,
}
-- ASN1STOP
```

Second, the PMCH-InfoList information element is structured as follows:

3) MBSFN subframe allocation pattern can only be changed when MCCH MP=5.12 s;

```
-- ASN1START
PMCH-InfoList-r9  ::=  SEQUENCE  (SIZE  (0..maxPMCH-PerMBSFN))  OF
PMCH-Info-r9
PMCH-Info-r9 ::=        SEQUENCE {
   pmch-Config-r9              PMCH-Config-r9,
   mbms-SessionInfoList-r9     MBMS-SessionInfoList-r9,
   ...
}
MBMS-SessionInfoList-r9  ::=  SEQUENCE  (SIZE  (0..maxSessionPerPMCH))  OF
MBMS-SessionInfo-r9
MBMS-SessionInfo-r9 ::=     SEQUENCE {
   tmgi-r9                         TMGI-r9,
   sessionId-r9            OCTET STRING (SIZE (1)) OPTIONAL, - Need OR
   logicalChannelIdentity-r9       INTEGER (0..maxSessionPerPMCH-1),
   ...
}
PMCH-Config-r9 ::=              SEQUENCE {
   Sf-AllocEnd-r9                    INTEGER (0..1535),
   dataMCS-r9                        INTEGER (0..28),
   mch-SchedulingPeriod-r9           ENUMERATED {
        rf8, rf16, rf32, rf64, rf128, rf256, rf512, rf1024},
   ...
}
```

Besides of the above first and second configurations, the MCCH information further includes: when in the MCCH modification period less than 5.12 seconds the network side changes the dataMCS of the MBMS. That is, the Modulation and Coding Scheme MCS of the PMCH data, or the network side changes the subframe allocation pattern of the MBSFN, 4) the MTCHs can be incremented or decremented on each PMCH (one LCID corresponding to each MTCH) or the MBSFN subframes occupied by one or some MTCHs might also be adjusted, except for the last PMCH, the change in the number of subframes occupied by each PMCH, that is, the number of MBSFN subframes occupied by each PMCH and the serial number of the start/end subframe can only be changed when MCCH MP=5.12 s.

When one or more MTCHs are carried on the PMCH, and when one or more MTCHs are added, then one or more sessions start, such as LCID X. If the number of subframes configured on the current PMCH cannot carry the new MTCHs, the priorities of the newly-added MTCHs needs to be considered. If an MTCH has the high priority, it preempts the current subframe resources of the MTCH, and the MCCH, MSI and PMCH data will be updated immediately; otherwise, the network side updates the MCCH, MSI and PMCH data after waiting for the end of the current MCCH MP of 5.12 seconds.

Embodiments of the present document will be described below in view of the above description of the main content included in the present document.

Figure 4:
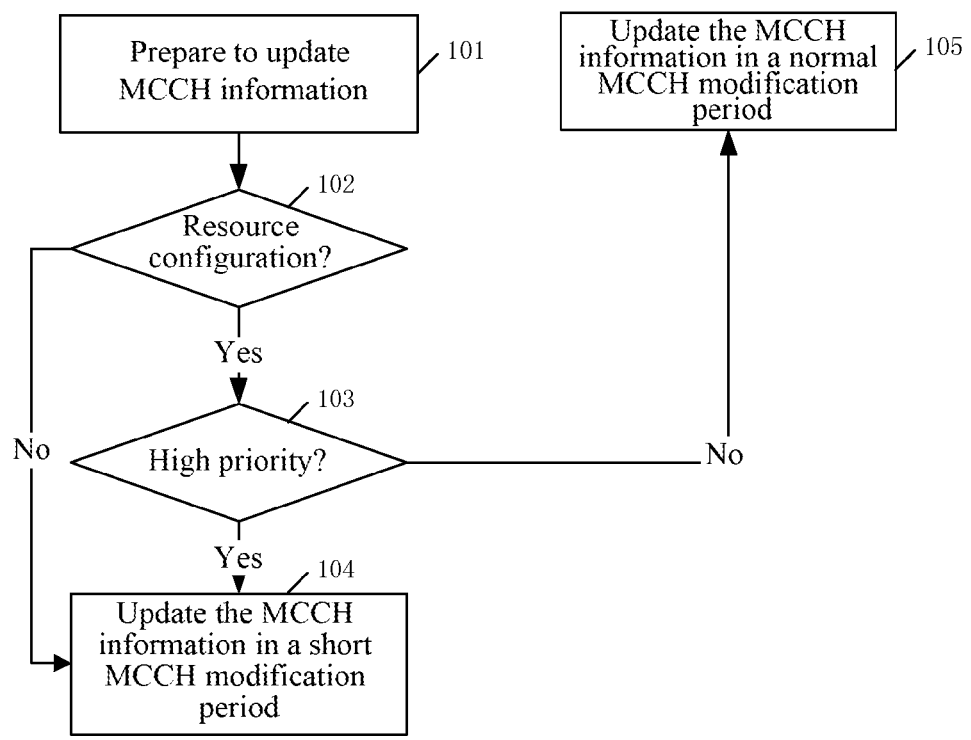
FIG. 4 is an implementation flow chart of a basic principle in accordance with a method embodiment of the present document.

A method for updating MCCH information is provided in the embodiment of the present document, the basic principle of which is shown in FIG. 4, herein the traditional UE is a UE with a minimum MCCH modification period of 5.12 seconds. The method includes the following steps:

in step 101, the network device needs to update the MCCH content in a short MCCH modification period.

In this step, the normal MCCH modification period may be an MCCH modification period equal to 5.12 seconds with respect to the short MCCH modification period, for example, a modification period less than 5.12 seconds, and will not be described in detail.

The network device includes at least one of eNB and MCE.

Said less than 5.12 seconds refers to any one of: 2.56 s, 1.28 s, 640 ms, 320 ms, 160 ms, 80 ms.

In step 102, whether the updated content is related to the resource configuration; and if yes, the processing proceeds to step 103, otherwise, proceeds to step 104.

The resource configuration includes one or more of the following: subframe allocation end sf-AllocEnd, data modulation and coding scheme dataMCS, subframe Allocation, or MBSFN subframe allocation pattern MSAP.

In step 103, whether the updated MBMS service has a high priority; if yes, the processing proceeds to step 104, otherwise proceeds to step 105.

The high priority refers to that the updated MBMS service has a higher priority than the existing MBMS service on the MCCH.

In step 104, the network device selects to update the MCCH information in the short MCCH modification period.

In this step, the network device may further update the MBMS scheduling information and/or the PMCH data in addition to updating the MCCH information.

Here, the network device updates the MCCH, the scheduling information and the PMCH data for the updated MBMS service having the high priority. It should be noted that updating the MCCH, the MBMS scheduling information and/or the PMCH data in this step may have an impact on the traditional UE, for example, the traditional UE cannot normally receive the MBMS service of interest.

In step 105, the network device selects to update the MCCH information in the normal MCCH modification period.

In this step, the network device may further update the MBMS scheduling information and/or the PMCH data in addition to updating the MCCH information.

Said 5.12 seconds refers to the 5.12 seconds corresponding to the current MCCH modification period, for example, when the current MCCH MP is 2.56 s, after the current MCCH MP ends, another 2.56 s is waited and then the MCCH, MSI and PMCH data are updated.

In short, in the short MCCH MP (herein the MCCH MP is less than 5.12 seconds), the MCCH content is not allowed to be changed except traffics with high priority, i.e., MCCH content can be changed only in the normal MCCH MP (MCCH MP=5.12 s), which includes one or more items of the following content:

1) the MCS of each PMCH can only be changed when MCCH MP=5.12 s;

2) the MBSFN subframe allocation pattern MSAP of the MBSFN area corresponding to the MCCH can only be changed when MCCH MP=5.12 s;

3) except the last PMCH, the end subframe of each PMCH can only be changed when MCCH MP=5.12 s, and the end subframe of the last PMCH can be changed in the current short MCCH MP;

4) except the last PMCH, the number of MBSFN subframes occupied by each PMCH can only be changed when MCCH MP=5.12 s.

Herein, except the last PMCH, the end subframes of other PMCHs cannot be changed. The end subframe of the PMCH not changing refers to that the serial number of the end subframe of the PMCH cannot be changed, that is, the value of sf-AllocEnd cannot be changed.

Based on the basic implementation principle of the above-mentioned method embodiment, the following description will be made with three specific application scenarios. The application scenarios are respectively: scenario of MBMS session start, scenario of MBMS session stop, scenario of MBMS session update, which are taken for example to be described.

Figure 5:
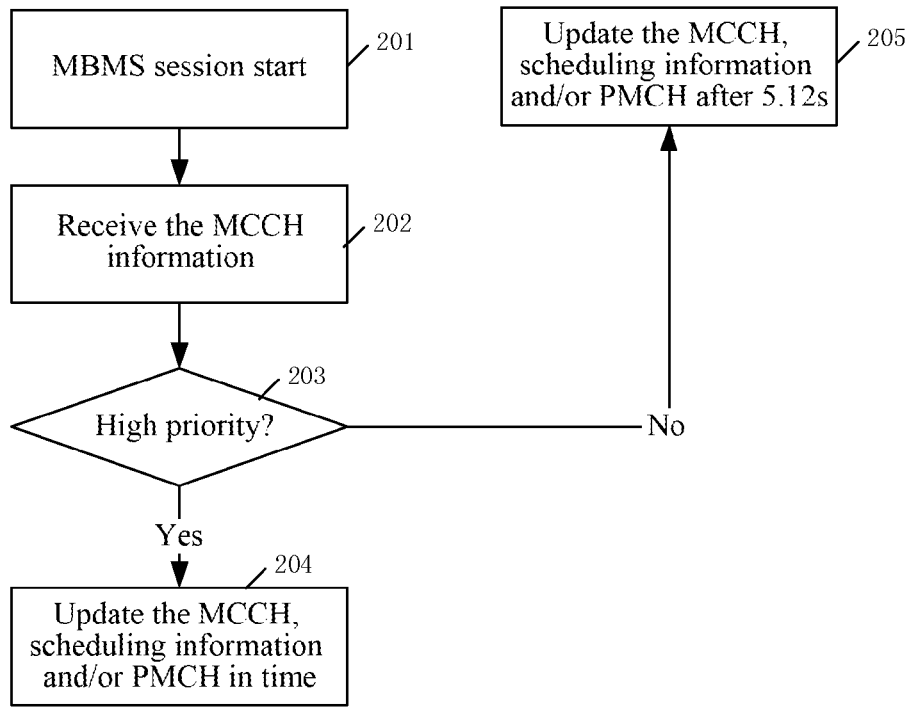
FIG. 5 is a flow chart of the implementation in accordance with a first method embodiment of the present document.

Method Embodiment 1:

For the scenario that the MBMS traffic is distributed on multiple PMCHs in an MBSFN area and there is an MBMS session start, the implementation method is shown in FIG. 5, including:

In step 201, there is an MBMS session start within the MCCH modification period less than 5.12 seconds.

The MBMS session is not the MTCH on the last PMCH; if the MBMS session is on the last PMCH, the start positions of other PMCHs are not changed, the traditional UE reads the MBMS session scheduling information, but the UE may directly discard it because the traditional UE cannot recognize it. The MBMS session results in changes of one or more of the following parameters: dataMCS, sf-AllocEnd, MSAP.

In step 202, the MBMS UE receives the MCCH information.

The MBMS UE refers to a UE that is receiving or is interested in receiving the MBMS traffic; herein, the traditional UE cannot receive the updated MCCH information within the MCCH MP less than 5.12 seconds, that is, the traditional UE receives the MCCH information which has not been updated yet.

In step 203, whether the MBMS traffic has a high priority; and if yes, the processing proceeds to step 204, otherwise, proceeds to step 205.

The high priority of the MBMS traffic may be determined by the network side through the Quality of Service QoS information of the MBMS, such as the Allocation and Retention Priority ARP parameter information.

In step 204, the network device transmits the updated MCCH information, the MBMS scheduling information, and/or the PMCH data to the UE.

The updated MCCH information, scheduling information and/or PMCH data may affect the traditional UE, for example, the traditional UE may not be able to read the updated MCCH, MSI, and/or cannot read the updated PMCH data.

In step 205, the network device waits for the end of the MCCH modification period of 5.12 seconds, and then the network device transmits the updated MCCH information, the scheduling information MSI and/or the PMCH data.

The update does not affect the traditional UE, i.e. the traditional UE can normally read the updated MCCH, MSI and/or PMCH data.

Figure 6:
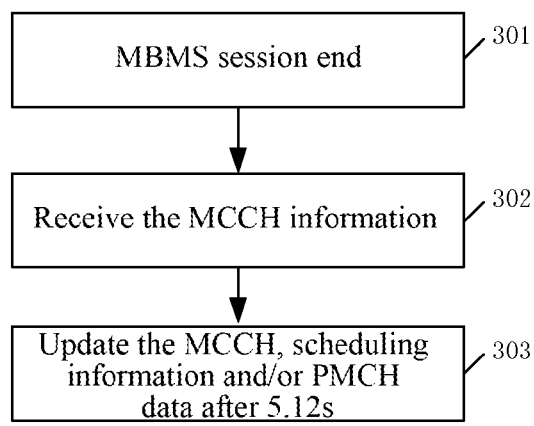
FIG. 6 is a flow chart of the implementation in accordance with a second method embodiment of the present document.

Method Embodiment 2:

For the scenario that the MBMS traffic is distributed on one or multiple PMCHs in an MBSFN area and there is an MBMS session stop, the implementation method is shown in FIG. 6, including:

In step 301, there is an MBMS session stop within the MCCH modification period less than 5.12 seconds.

The MBMS session stop refers to the end of MBMS traffic.

In step 302, the MBMS UE receives the MCCH information.

In step 303, the network device waits for the end of MCCH modification period of 5.12 seconds ends, and then the network device updates the MCCH information, the MBMS scheduling information and/or the PMCH data.

If the abovementioned MBMS session is located on the MTCH of the last PMCH in the MCCH, the network device updates the MCCH and the MSI in time since the MBMS session has little effect on the traditional UE receiving the updated MSI in the MSI, i.e., the traditional UE may ignore the change of the MBMS session; otherwise, the network device waits for the MCCH MP of 5.12 seconds, and then the network device updates the MCCH, MSI, and/or PMCH data.

Figure 7:
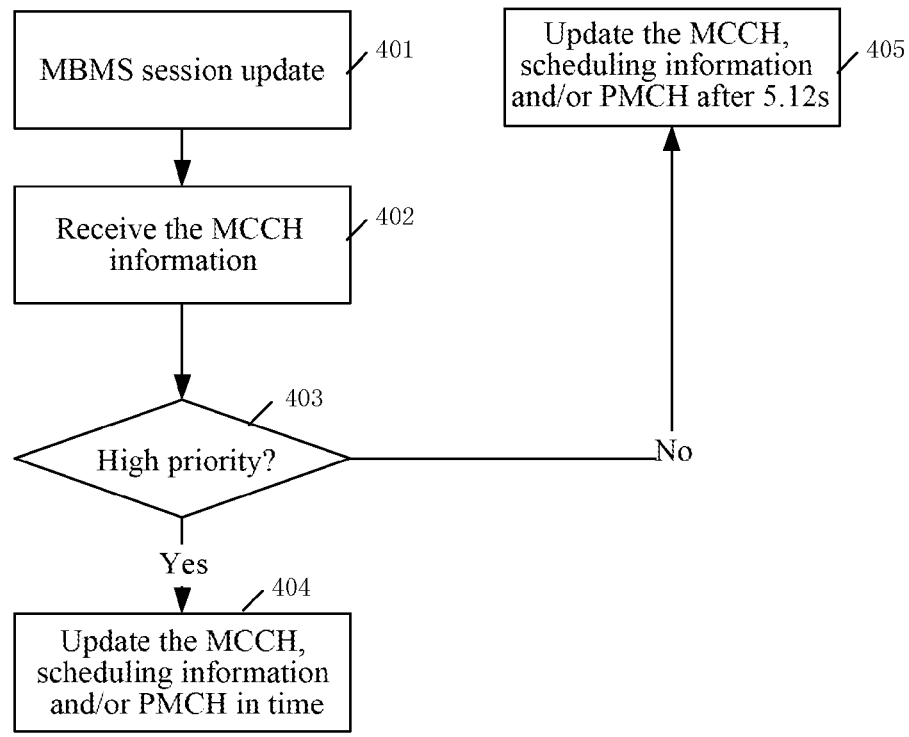
FIG. 7 is a flow chart of the implementation in accordance with a third method embodiment of the present document.

Method Embodiment 3:

For the scenario that the MBMS traffic is distributed on one or more PMCHs in an MBSFN area and there is an MBMS session start, the implementation method is shown in FIG. 7, including:

in step 401, there is an MBMS session update within the MCCH modification period less than 5.12 seconds.

The MBMS session update includes any one or more of the following: Sf-AllocaEnd, dataMCS, MSAP.

In step 402, the MBMS UE receives the MCCH information.

In step 403, whether the updated MBMS traffic has a high priority; and if yes, the processing proceeds to step 404, otherwise proceeds to step 405.

In step 404, the network device updates the MCCH information, the MBMS scheduling information, and/or the PMCH data.

In step 405, the network device waits for the end of the MCCH modification period of 5.12 seconds ends, and then the network device transmits the updated MCCH information, MBMS scheduling information, and/or PMCH data.

If the abovementioned MBMS session update changes the subframe position of the current PMCH and the PMCH is not the last one on the MCCH, the network device waits for the end of the current MCCH MP of 5.12 seconds, and then updates the MCCH, MSI and/or PMCH data; otherwise, the network device updates the MCCH, MSI and/or PMCH data in time.

Method Embodiment 4:

An embodiment of the present document provides a method for updating MCCH information, herein, the method includes:

When an MBSFN area is configured with one MCCH and multiple PMCHs, and the network side needs to update the MCCH information in a short MCCH modification period, one or more of the following criteria needs to be adhered to:

The data modulation and coding scheme of each PMCH cannot be changed in the short MCCH modification period, that is, it can only be changed in the normal MCCH modification period.

The MBSFN subframe allocation pattern of the MBSFN area corresponding to the MCCH cannot be changed in the short MCCH modification period, that is, it can only be changed in the normal MCCH modification period.

Except the last PMCH, the end subframe of each PMCH cannot be changed in the short MCCH modification period, that is, it can only be changed in the normal MCCH modification period.

The end subframe of the last PMCH may be changed in the short MCCH modification period.

In an alternative embodiment of the present document, the normal MCCH modification period is an MCCH modification period equal to 5.12 seconds.

In an alternative embodiment of the present document, except the last PMCH, the number of MBSFN subframes occupied by each PMCH can only be changed in the normal MCCH modification period.

Figure 8:
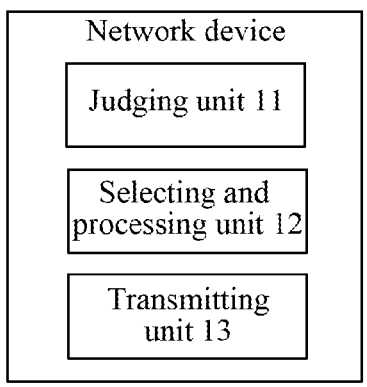
FIG. 8 is a schematic diagram of the composition structure of a network device in accordance with an embodiment of the present document.

Corresponding to the description of the method embodiment at the network side, the embodiment of the present document further provides a network device. As shown in FIG. 8, the network device includes judging unit 11, selecting and processing unit 12, and transmitting unit 13. Herein, the judging unit 11 is configured to, when the MCCH information needs to be updated in a short Multicast Control CHannel MCCH modification period, judge whether the updated MCCH information is related to the resource configuration change of the MBMS traffic data, and when the updated MCCH information is related to the resource configuration change of the MBMS traffic data, notify the selecting and processing unit 12 to implement the processing. The selecting and processing unit 12 is configured to, according to the priority of the MBMS traffic data for which the resource configuration is changed, select to update the MCCH information in the short MCCH modification period; or, select to update the MCCH information in the normal MCCH modification period. The transmitting unit 13 is configured to transmit the updated MCCH information.

In an alternative embodiment of the present document, the short MCCH modification period includes: an MCCH modification period less than 5.12 seconds.

The normal MCCH modification period is an MCCH modification period equal to 5.12 seconds.

In an alternative embodiment of the present document, the resource configuration includes one or more of the following:

subframe allocation end;
data modulation and coding scheme;
the number of allocated subframes;
Multimedia Broadcast Multicast over Single Frequency Network MBSFN subframe allocation mode.

In an alternative embodiment of the present document, the network device further includes:

a configuring unit, configured to set to not allowing to change the MCCH content in a short MCCH modification period, expect the MBMS traffic data with high priority, and only allowing to change the MCCH content in the normal MCCH modification period, including one or more items of the following content:

The data modulation and coding scheme of each PMCH can only be changed in the normal MCCH modification period.

The MBSFN subframe allocation pattern of the MBSFN area corresponding to the MCCH can only be changed in the normal MCCH modification period.

Except the last PMCH, the end subframe of each PMCH can only be changed in the normal MCCH modification period, and the end subframe of the last PMCH can be changed in the current short MCCH modification period.

Except the last PMCH, the number of MBSFN subframes occupied by each PMCH can only be changed in the normal MCCH modification period.

In an alternative embodiment of the present document, the network device needs to update the MCCH information when there is an MBMS session start in a short MCCH modification period, and in the case that the MBMS session is not on the last PMCH, the network device further includes:

a priority determining unit, configured to determine a priority of the MBMS traffic data through Quality of Service QoS information of the MBMS;

the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have the high priority.

In an alternative embodiment of the present document, for the network device, in the case that the MBMS traffic of one MBSFN area is distributed on one or more PMCHs and the MCCH information needs to be updated when there is an MBMS session end in a short MCCH modification period, the selecting and processing unit is further configured to update the MCCH information in the normal MCCH modification period.

In an alternative embodiment of the present document, in the case that the MBMS traffic in an MBSFN area is distributed on one or more PMCHs and the MCCH information needs to be updated when there is an MBMS session update in a short MCCH modification period, the network device further includes:

a priority determining unit, configured to determine the priority of the MBMS traffic data through Quality of Service QoS information of the MBMS;

the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have the high priority;

the MBMS session update includes one or more of subframe allocation end, data modulation and coding scheme, and MBSFN subframe allocation pattern.

For the user side, the embodiment of the present document further provides a method for receiving updated MCCH information, herein the method includes: the user side receives the updated MCCH information.

Here, the updated MCCH information is: MCCH information selected by the network side to be updated in a short MCCH modification period, or the MCCH information selected to be updated in the normal MCCH modification period based on the priority of the MBMS traffic data for which the resource configuration is changed.

In an alternative embodiment of the present document, the method further includes:

the user side receives the updated MCCH information, reads the updated MBMS scheduling information based on the updated MCCH information, and reads the updated PMCH data based on the updated MCCH and the updated MBMS scheduling information.

Figure 9:
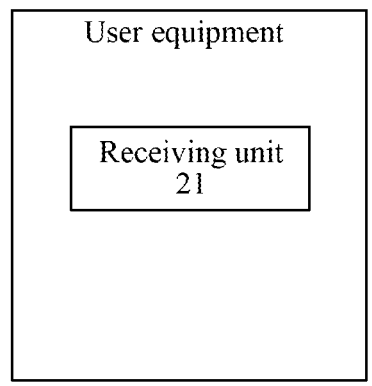
FIG. 9 is a schematic diagram of the composition structure of a user equipment in accordance with an embodiment of the present document.

Corresponding to the description of the method embodiment at the user side, the embodiment of the present document further provides a user equipment. As shown in FIG. 9, the user equipment includes:

receiving unit 21, configured to receive the updated MCCH information for the user side;

Here, the updated MCCH information is: MCCH information selected by the network side to be updated in a short MCCH modification period, or the MCCH information selected to be updated in the normal MCCH modification period based on the priority of the MBMS traffic data for which the resource configuration is changed.

In an alternative embodiment of the present document, the user equipment further includes:

a reading unit, configured to receive the updated MCCH information, read the updated MBMS scheduling information according to the updated MCCH information, and read the updated PMCH data according to the updated MCCH and the updated MBMS scheduling information.

Figure 10:
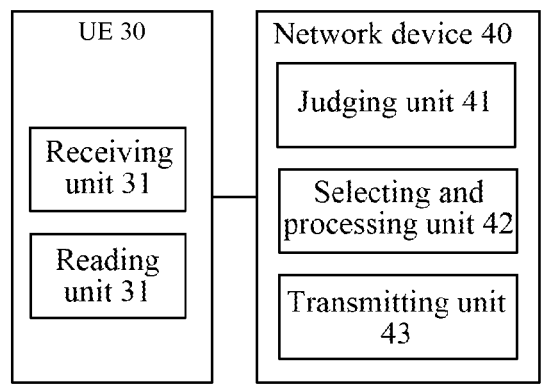
FIG. 10 is a schematic diagram of the composition structure of a system in accordance with an embodiment of the present document.

The embodiment of the present document further provides a system for updating MBMS traffic data. As shown in FIG. 10, the system includes UE 30 and network device 40. Herein, the UE 30 is configured to receive the updated MCCH information. The network device 40 is configured to select to transmit the updated MCCH information to the UE 30 in the short MCCH modification period, or select to transmit the updated MCCH information to the UE 30 in the normal MCCH modification period according to the priority of the MBMS traffic.

The network device 40 includes any one of MCE and eNB.

The UE 30 specifically includes:

the receiving unit 31 is configured to receive the updated MCCH information at the user side;

the reading unit 32 is configured to receive the updated MCCH information, read the updated MBMS scheduling information according to the updated MCCH information, and read the updated PMCH data according to the updated MCCH and the updated MBMS scheduling information.

The network device 40 specifically includes:

the judging unit 41 is configured to, when the MCCH information needs to be updated in the short Multicast Control CHannel MCCH modification period, judge whether the updated MCCH information is related to the resource configuration change of the MBMS traffic data. When the updated MCCH information is related to the resource configuration change of the MBMS traffic data, notify the selecting and processing unit 12 to implement the processing;

the selecting and processing unit 42 is configured to, according to the priority of the MBMS traffic data for which the resource configuration is change, select to update the MCCH information in the short MCCH modification period, or select to update the MCCH information in the normal MCCH modification period;

the transmitting unit 43 is configured to transmit the updated MCCH information.

The acronyms covered here are as follows:
EPS: Evolved Packet System;
MAC: Media Access Control;
MBMS: Multimedia Broadcast/Multicast Service;
GCSE: Group Communication Service Enabler;
BM-SC: Broadcast Multicast-Service Centre;
MBSFN: MBMS over a Single Frequency Network;
MCH: Multicast Channel;

MCCH: Multicast Control Channel;
MSAP: MBSFN Subframe Allocation Pattern;
PMCH: Physical Multicast Channel;
MCE: Multicell/Multicast Coordination Entity;
MCS: Modulation and Coding Scheme;
MME: Mobility Management Entity;
MSI: MCH Scheduling Information;
MTCH: Multicast Traffic Channel;
QoS: Quality of Service;
TMGI: Temporary Mobile Group Identity.

When the integrated module described in the embodiments of the present document is implemented in the form of a software function module and sold or used as a stand-alone product, it may also be stored in a computer-readable storage medium. Based on this understanding, the technical scheme of the embodiment of the present document, in essence or in the part contributed to the existing art, can be embodied in the form of software product. The computer software product is stored in a storage medium, and includes a number of instructions, so that a computer device (which may be a personal computer, a server, or a network device, etc.) performs all or part of the methods described in the various embodiments of the present document. The abovementioned storage medium includes a USB disk, a removable hard disk, a Read-Only Memory ROM, a Random Access Memory RAM, a magnetic disk, an optical disk, and the like, which can store program codes. Thus, embodiments of the present document are not limited to any particular combinations of hardware and software.

Accordingly, the embodiment of the present document further provides a computer storage medium in which the computer program is stored. The computer program is used for implementing the method for updating the MCCH information and the method for receiving the updated MCCH information in accordance with the embodiments of the present document.

The abovementioned description is only alternative embodiments of the present document and is not intended to limit the protection scope of the present document.

INDUSTRIAL APPLICABILITY

With the embodiment of the present document, for the MCCH information needs to be updated in the short MCCH modification period, according to the priority of the MBMS traffic data for which the resource configuration is changed, the MCCH information may be selected to be updated in the short MCCH modification period, or the MCCH information is selected to be updated in the normal MCCH modification period. Therefore, after the updated MCCH information is transmitted from the network side to the UE side, the updated MCCH information can be correctly read by the UE after reception, thereby solving the forward compatibility issue which the UE in the R12 might have because the R12 does not shorten the MCCH minimum period but the R13 does.

What is claimed is:

1. A method for updating multimedia broadcast multicast control channel information, comprising:
    updating, by a network side, Multicast Control CHannel (MCCH) information in a short MCCH modification period, when the MCCH information to be updated is related to a resource configuration change of Multimedia Broadcast Multicast Service (MBMS) traffic data, based on a priority of the MBMS traffic data for which the resource configuration is changed, if the priority is a high priority, selecting to update the MCCH information in the short MCCH modification period; if the priority is not a high priority, selecting to update the MCCH information in a normal MCCH modification period; wherein the high priority refers to that the updated MBMS service has a higher priority than the existing MBMS service on the MCCH;
    transmitting, by the network side, the updated MCCH information.

2. The method of claim 1, wherein, the method further comprises:
    the short MCCH modification period comprising an MCCH modification period less than 5.12 seconds;
    the normal MCCH modification period being an MCCH modification period equal to 5. 12 seconds.

3. The method of claim 1, wherein, the resource configuration comprises one or more of the following:
    subframe allocation ending;
    data modulation and coding scheme;
    a number of allocated subframes;
    Multimedia Broadcast Multicast over Single Frequency Network (MBSFN) subframe allocation pattern.

4. The method of claim 1, wherein, the method further comprises:
    in the short MCCH modification period, except MBMS traffic data with a high priority, not allowing to change content of the MCCH, and only allowing to change the content of the MCCH in the normal MCCH modification period, which comprises one or more items of the following content:
    the data modulation and coding scheme of each Physical Multicast CHannel (PMCH) only being able to be changed in the normal MCCH modification period;
    the Multimedia Broadcast Multicast over Single Frequency Network (MBSFN) subframe allocation pattern of an MBSFN area corresponding to the MCCH only being able to be changed in the normal MCCH modification period;
    except the last PMCH, an end subframe of each PMCH only being able to be changed in the normal MCCH modification period, and an end subframe of the last PMCH being able to be changed in a current short MCCH modification period;
    except the last PMCH, a number of MBSFN subframes occupied by each PMCH only being able to be changed in the normal MCCH modification period.

5. The method of claim 1, wherein, the MCCH information is updated when there is an MBMS session start within the short MCCH modification period, and the MBMS session is not on the last Physical Multicast CHannel (PMCH); and
    the method further comprises:
    determining, by the network side, the priority of the MBMS traffic data through Quality of Service (QoS) information of the MBMS;
    updating, by the network side, the MCCH information in the short MCCH modification period when judging that the MBMS traffic data for which the resource configuration is changed have a high priority;
    updating, by the network side, the MCCH information in the normal MCCH modification period when judging that the MBMS traffic data for which the resource configuration is changed do not have a high priority.

6. The method of claim 1, wherein, the MBMS traffic in one Multimedia Broadcast Multicast over Single Frequency Network (MBSFN) area is distributed on one or more Physical Multicast CHannels (PMCHs), and the MCCH information is updated when there is an MBMS session end in the short MCCH modification period; and the method further comprises:
updating, by a network device, the MCCH information in the normal MCCH modification period.

7. The method of claim 1, wherein, the MBMS traffic in one Multimedia Broadcast Multicast over Single Frequency Network (MBSFN) area is distributed on one or more Physical Multicast CHannels (PMCHs), and the MCCH information is updated when there is an MBMS session update in the short MCCH modification period; and the method further comprises:
determining, by the network side, the priority of the MBMS traffic data through Quality of Service (QoS) information of the MBMS;
updating, by the network side, the MCCH information in the short MCCH modification period when judging that the MBMS traffic data for which the resource configuration is changed have a high priority;
updating, the network side, the MCCH information in the normal MCCH modification period when judging that the MBMS traffic data for which the resource configuration is changed do not have a high priority;
the MBMS session update comprises one or more of subframe allocation ending, data modulation and coding scheme, and MB SFN subframe allocation pattern.

8. A network device, comprising: hardware performing instructions stored in a non-transitory computer readable medium which executes steps in following units: a judging unit, a selecting and processing unit, and a transmitting unit; wherein, the judging unit is configured to, when Multicast Control CHannel (MCCH) information is updated in a short MCCH modification period, judge whether the MCCH information to be updated is related to a resource configuration change of Multimedia Broadcast Multicast Service (MBMS) traffic data, and when the MCCH information to be updated is related to the resource configuration change of the MBMS traffic data, notify the selecting and processing unit to implement a processing;
the selecting and processing unit is configured to, based on a priority of the MBMS traffic data for which the resource configuration is changed, if the priority is a high priority, select to update the MCCH information in the short MCCH modification period; if the priority is not a high priority, select to update the MCCH information in a normal MCCH modification period; wherein the high priority refers to that the updated MBMS service has a higher priority than the existing MBMS service on the MCCH;
the transmitting unit is configured to transmit the updated MCCH information.

9. The network device of claim 8, wherein, the short MCCH modification period comprises an MCCH modification period less than 5.12 seconds;
the normal MCCH modification period is an MCCH modification period equal to 5.12 seconds.

10. The network device of claim 8, wherein, the resource configuration comprises one or more of the following:
subframe allocation ending;
data modulation and coding scheme;
a number of allocated subframes;
Multimedia Broadcast Multicast over Single Frequency Network (MBSFN) subframe allocation pattern.

11. The network device of claim 8, wherein, the hardware performing the instructions stored in the non-transitory computer readable medium further executes steps in a following unit:
a configuring unit, configured to set to not allow to change content of the MCCH in the short MCCH modification period, expect the MBMS traffic data with a high priority, and only allow to change the content of the MCCH in the normal MCCH modification period, which comprises one or more items of the following content:
the data modulation and coding scheme of each Physical Multicast CHannel (PMCH) only being able to be changed in the normal MCCH modification period;
the Multimedia Broadcast Multicast over Single Frequency Network (MBSFN) subframe allocation pattern of the MBSFN area corresponding to the MCCH only being able to be changed in the normal MCCH modification period;
except the last PMCH, an end subframe of each PMCH only being able to be changed in the normal MCCH modification period, and an end subframe of the last PMCH only being able to be changed in a current short MCCH modification period;
except the last PMCH, a number of MBSFN subframes occupied by each PMCH only being able to be changed in the normal MCCH modification period.

12. The network device of claim 8, wherein, the network device updates the MCCH information when there is an MBMS session start in the short MCCH modification period, and in the case that the MBMS session is not on the last Physical Multicast CHannel (PMCH), the hardware performing the instructions stored in the non-transitory computer readable medium further executes steps in a following module:
a priority determining unit, configured to determine the priority of the MBMS traffic data through Quality of Service (QoS) information of the MBMS;
the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have a high priority.

13. The network device of claim 8, wherein, for the network device, in a case that the MBMS traffic in one Multimedia Broadcast Multicast over Single Frequency Network (MBSFN) area are distributed on one or more Physical Multicast CHannels (PMCHs), and the MCCH information is updated when there is an MBMS session end in the short MCCH modification period,
the selecting and processing unit is further configured to update the MCCH information in the normal MCCH modification period.

14. The network device of claim 8, wherein, in a case that the MBMS traffic in one Multimedia Broadcast Multicast over Single Frequency Network (MBSFN) area are distributed on one or more Physical Multicast CHannels (PMCHs), and the MCCH information is updated when there is an MBMS session update in the short MCCH modification period, the hardware performing the instructions stored in the non-transitory computer readable medium further executes steps in a following unit:

a priority determining unit, configured to determine the priority of the MBMS traffic data through Quality of Service (QoS) information of the MBMS;

the selecting and processing unit is further configured to update the MCCH information in the short MCCH modification period when judging that the MBMS traffic data for which the resource configuration is changed have a high priority, and update the MCCH information in the normal MCCH modification period when judging that the MBMS traffic data for which the resource configuration is changed do not have the high priority;

the MBMS session update comprises one or more of subframe allocation ending, data modulation and coding scheme, and MB SFN subframe allocation pattern.

15. A method for receiving updated multimedia broadcast multicast control channel information, wherein the method comprises:

receiving, by a user side, updated Multicast Control CHannel (MCCH) information;

the updated MCCH information is MCCH information selected by a network side, based on a priority of Multimedia Broadcast Multicast Service (MBMS) traffic data for which a resource configuration is changed, to be updated in a short MCCH modification period when the priority is a high priority; or to be updated in a normal MCCH modification period when the priority is not a high priority; wherein the high priority refers to that the updated MBMS service has a higher priority than the existing MBMS service on the MCCH.

16. A user equipment, comprising: hardware performing instructions stored in a non-transitory computer readable medium which executes steps in a following unit:

a receiving unit, configured to receive updated Multicast Control CHannel (MCCH) information for a user side;

the updated MCCH information is MCCH information selected by a network side,-based on a priority of the Multimedia Broadcast Multicast Service (MBMS) traffic data for which a resource configuration is changed, to be updated in a short MCCH modification period when the priority is a high priority; or to be updated in a normal MCCH modification period when the priority is not a high priority; wherein the high priority refers to that the updated MBMS service has a higher priority than the existing MBMS service on the MCCH.

\* \* \* \* \*